United States Patent [19]
Nowick

[11] Patent Number: 5,292,210
[45] Date of Patent: Mar. 8, 1994

[54] DUSTLESS HOLE SAW ENCLOSURE

[76] Inventor: Linda P. Nowick, 329 Via Colusa Rd., Redondo Beach, Calif. 90277

[21] Appl. No.: 988,767

[22] Filed: Dec. 10, 1992

[51] Int. Cl.⁵ ............................................. B23B 45/00
[52] U.S. Cl. ...................................... 408/67; 408/204
[58] Field of Search ................. 408/67, 204, 241 R, 408/241 G; 409/134

[56] References Cited

U.S. PATENT DOCUMENTS 4,955,984  9/1990  Cuevas ............................... 408/67

FOREIGN PATENT DOCUMENTS 3140776  4/1983  Fed. Rep. of Germany ........ 408/67
915353  11/1946  France ........................... 408/241 G
2211117  6/1989  United Kingdom ................. 408/67

OTHER PUBLICATIONS

ELCO Lighting "Recessed Lights Adjustable Hole Saw", advertisement in *Electrical News*, Pacific Southwest–Monthly, vol. 9, No. 12, Dec. 1992, p. 21.

*Primary Examiner*—Steven C. Bishop
*Attorney, Agent, or Firm*—Robbins, Berliner & Carson

[57] ABSTRACT

A dustless hole saw includes a compressible dust catcher surrounding a saw blade removably affixed to a rotating circular frame. The generally cylindrical compressible boot has an end plate at the end furthest from the saw blade. One end of a generally cylindrical sleeve is affixed to the end plate and the other is attachable to a drill motor. The boot encloses the chuck of the drill motor and has an access opening in its sidewall to permit adjustment of the chuck. The end plate may be at least partially transparent to permit the operator to align the pilot drill of the saw. As the hole saw cuts into the work surface, the boot is pressed against the surface outside the perimeter of the cut catching the dust and debris created by the cutting operation.

8 Claims, 3 Drawing Sheets

DUSTLESS HOLE SAW ENCLOSURE

BACKGROUND OF THE INVENTION

1. Field of the Invention.

This invention relates generally to the field of motorized hand tools and in particular to hole saws adapted for use with drill motors.

2. Description of the Prior Art.

Improved hole saws are now available which are constructed by fastening one or more flexible metal saw blades to the circumference of a cylindrical frame. The saw blade is attached to the frame so that the teeth of the saw blade or blades extend beyond the end of the frame. The frame may contain holes for weight and or balance and is adapted to fit in the chuck of a portable drill motor.

The use of such hole saws in the building trades presently creates an environmental problem. The saws produce a significant amount of dust and debris as openings are cut into walls, ceilings and other flat surfaces. The dust is normally scattered over the work area, the operator and the drill motor. This problem is of particular concern when making overhead openings of the type required for the installation of recessed lighting fixtures.

While the operator may use protective clothing and a dust mask for personal protection, this does not resolve the problem of dust scattering around the work area or falling into a drill motor. The environmental problem is of particular concern when openings are needed in interior surfaces of existing structures where the dust will fall on carpets, furniture and other room furnishings. Drop cloths may be used to protect the immediate area around the hole cutting operation, however, finer dust particles may settle a significant distance away from the work area.

What is needed is a hole saw which will permit the cutting of openings in walls, ceilings and other surfaces, while preventing the dust created by the cutting operation from escaping into the environment.

SUMMARY OF THE INVENTION

The present invention overcomes the problems of the prior art by providing a drill motor saw enclosure having means for containing dust created by a drill motor saw, means for removably attaching the dust containing means to the drill motor, and access means through the dust containing means to permit the adjusting the drill motor chuck. Means are provided for viewing the saw through a portion of the dust containing means.

In another aspect, the present invention provides a saw enclosure attachable to a drill motor, the enclosure having a generally cylindrical boot compressible along its long axis, an end plate attached within one end portion of the boot, a generally cylindrical sleeve attachable to the drill motor and adapted to fit over a drill motor chuck, the sleeve having one end affixed to the end plate and the other end affixable to the drill motor, and a closable access in the sidewall of the sleeve, through which the drill motor chuck may be adjusted.

In a still further aspect the present invention provides a dustless hole saw having a generally cylindrical frame, a saw blade removably affixed to the frame, the teeth of the saw blade extending radially beyond one end of the frame, a generally cylindrical boot enclosing the saw blade and frame, the boot being compressible along its long axis, an end plate attached within one end portion of the boot, a generally cylindrical sleeve, attachable to a drill motor frame and adapted to fit over a drill motor chuck, the sleeve having one end affixed to the end plate and the other end affixable to the frame of the drill motor, and a closable access in the sidewall of the sleeve, through which the drill motor chuck may be adjusted. The end plate may be at least partially transparent.

In a still further aspect, the present invention provides a dustless hole saw wherein the closable access in the sidewall of the sleeve has a threaded aperture and a threaded plug insertable into the aperture.

In a still further aspect the present invention provides a saw enclosure attachable to a drill motor, the enclosure having a generally cylindrical boot portion compressible along its long axis, a semi-rigid truncated conical portion extending from one end of the boot portion, the smaller end of the conical portion attachable to the drill motor and adapted to fit over a drill motor chuck, and a transparent closable access in the sidewall of the truncated conical portion through which the drill motor chuck may be adjusted and through which at least a portion of a saw placed within the enclosure may be observed by an operator.

These and other features and advantages of this invention will become further apparent from the detailed description that follows which is accompanied by one or more drawing figures. In the figures and description, numerals indicate the various features of the invention, like numerals referring to like features throughout both the drawings and the description.

DETAILED DESCRIPTION OF THE PREFERRED EMBODIMENTS

Figure 1:
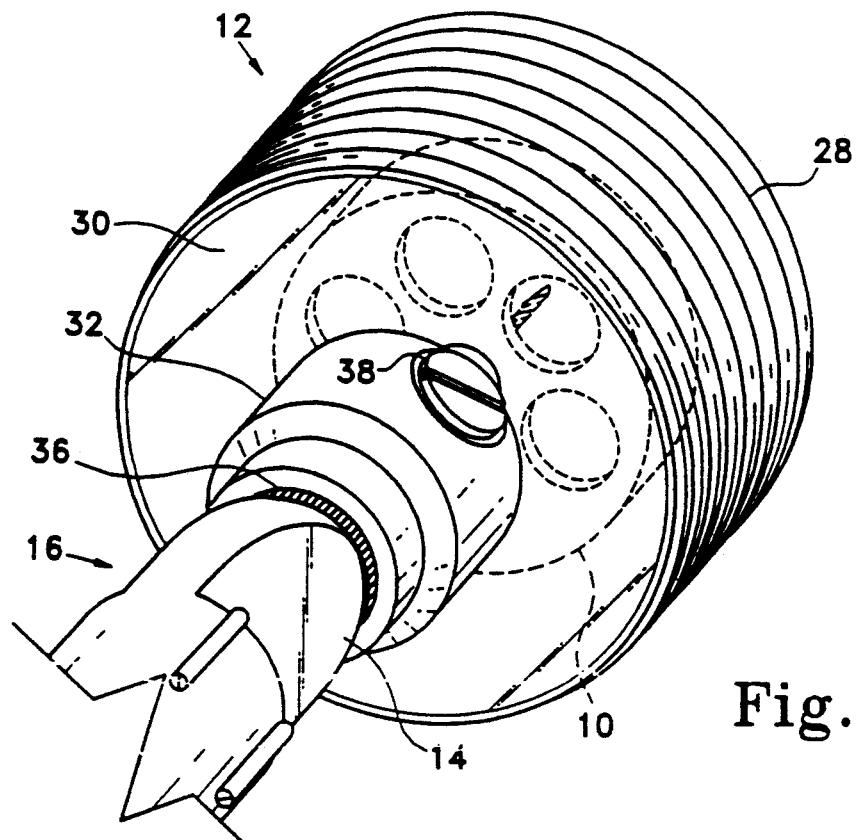
FIG. 1 is an isometric view of a dustless hole saw embodying principles of the present invention, shown attached to a drill motor.
Figure 2:
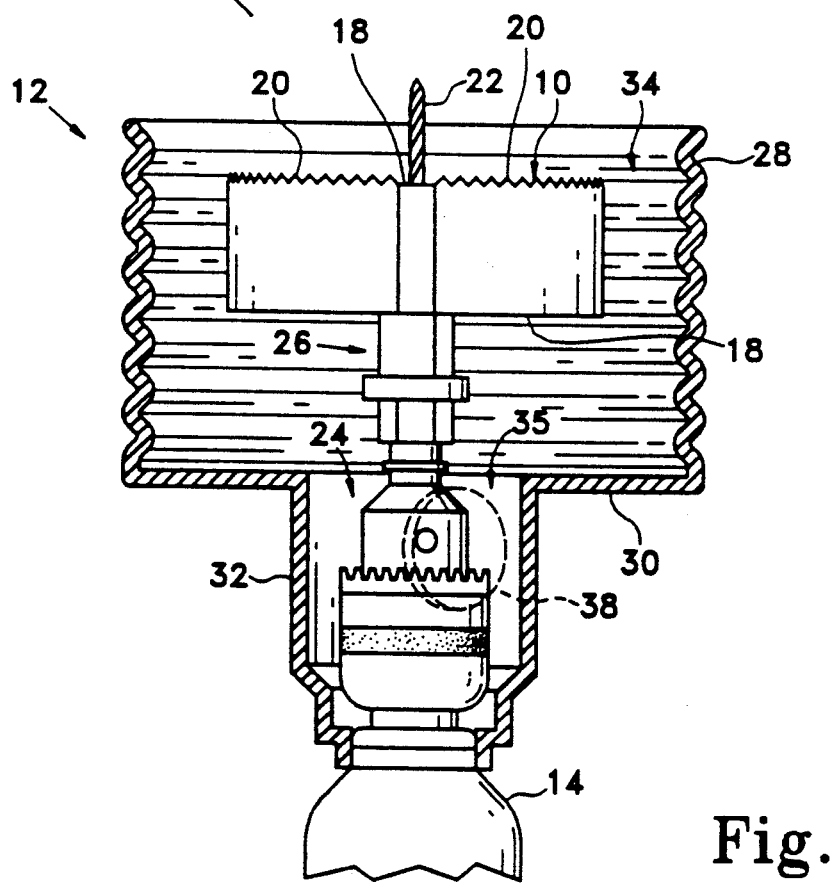
FIG. 2 is a partially cut away side elevation view of the dustless hole saw shown in FIG. 1.

As generally shown in FIGS. 1 and 2, the present invention provides hole saw 10 enclosed within dust catcher 12 which is removably mounted on frame or housing 14 of portable drill motor 16. Suitable drill motors are available from many manufacturers including the ¼", ⅜", ½", and ¾" models sold by Makita, Milwaukee, Black & Decker, Wen, Skill, AEG, and Ryobi.

Hole saw 10 has a generally cylindrical frame 18 with one or more metal saw blades 20 removably affixed to the perimeter of frame 18. Saw blade 20 is positioned so that the teeth of blade 20 extend axially away from the end of frame 18. Drill 22 is mounted in the center of frame 18 to drill a pilot hole to guide the cutting operation of blade 20. Frame 18 is held in drill chuck 24 by hole saw bit 26. Hole saw 10 is not limited to the embodiment described as hole saws of varying configurations are well known in the art. Suitable hole saws are generally available and include the arbor models 828 and 829 from Green Lee, as the arbor models 30001-1L, 30002-2L, and 30004-4L from Lennox. Circular drill bits of this type are preferred for use as hole saw 10,, rather than the type of hole cutter which include a single blade that rotates in a circular motion, to avoid cutting problems, such getting fouled in the heavy wire mesh as might be encountered while cutting into plaster in an older house.

Figure 3:
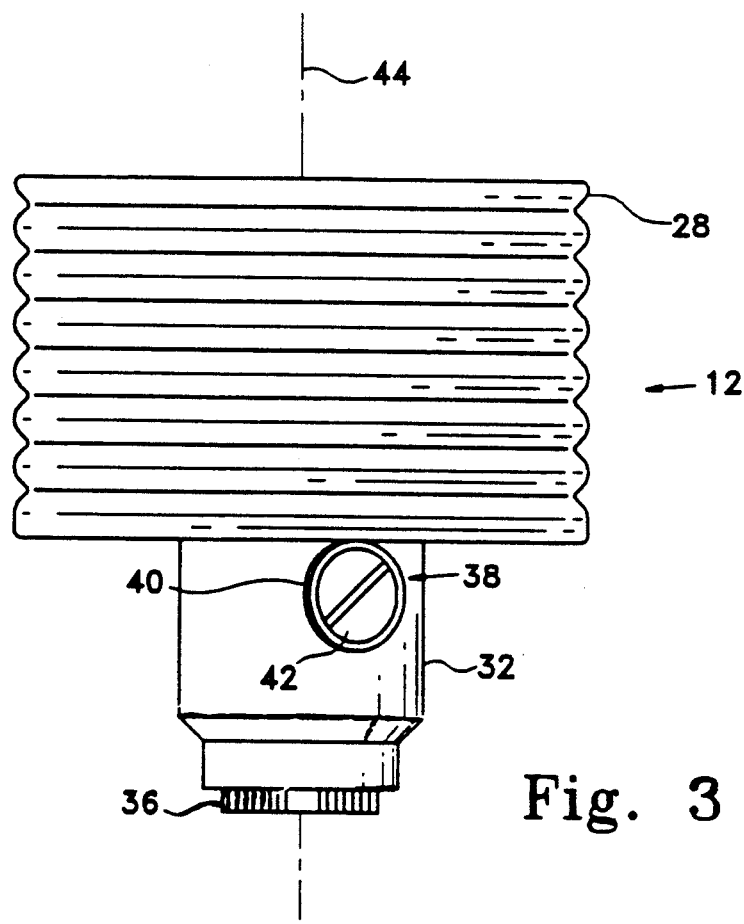
FIG. 3 is a side elevation view of a portion of the dustless hole saw shown in FIG. 1.
Figure 4:
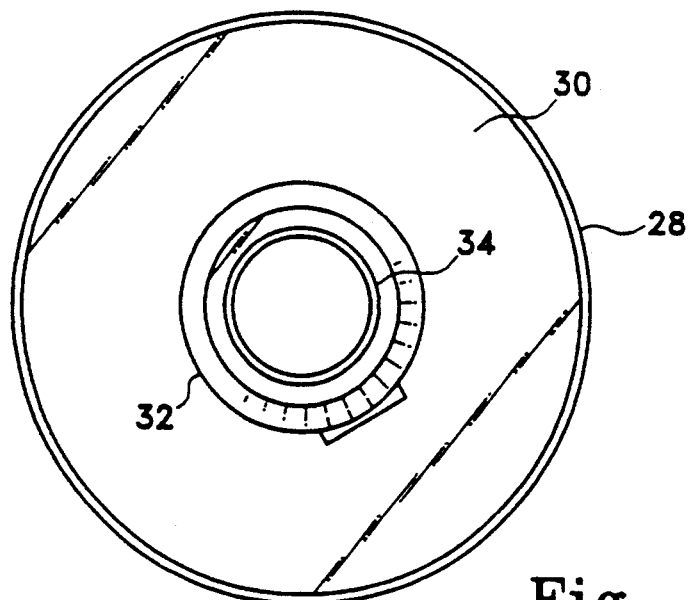
FIG. 4 is a top plan view of the portion of the dustless hole saw shown in FIG. 1.

Referring additionally now to FIGS. 3 and 4, dust catcher 12 is formed of boot 28, end plate 30 and sleeve 32. Boot 28 is generally cylindrical in shape and is made to be resilient allowing compression along its long axis 44. Boot 28 may conveniently be formed of air duct tubing or other flexible materials which will return to their original shape after being compressed, such as wire reinforced molded plastic or vinyl. A suitable material is available from Mercer Rubber Inc. of Commerce, Calif. as aero duct wire reinforced baffle or light plastic duct. The material should be sufficiently stiff so that it will not droop inwards and contact hole saw 10.

Boot or dust catcher 12 is adapted to enclose hole saw 10, while leaving a sufficient clearance 34 between the perimeter of hole saw 10 and the interior surface of boot 28 to permit free rotation of drill chuck 24 in spite of the dust and debris which may move through clearance 34 to collect between the interior portion of dust catcher 12 and drill chuck 24.

End plate 30 is attached to the lower end portion of boot 28. The presently preferred method of attaching end plate 30 to boot 28 is to adhesively bond the perimeter of end plate 30 to the inside surface of boot 28. However, other attachment techniques may be used, such as an encircling clamp. End plate 30 partially closes the lower end of dust catcher 12 and includes a central opening providing a means to interconnect boot 28 with sleeve 32. Center opening 35 through end plate 30 is sized to permit drill motor chuck 24 to be inserted through center opening 35. End plate 30 is formed of a rigid light weight material.

In a preferred embodiment of the present invention, end plate 30 is constructed of a transparent material, such as a clear acrylic plastic or plexiglass, to permit the operator to easily view drill 22 while drilling the initial pilot hole at a target location. The pilot hole permits proper alignment of hole saw 10 during the subsequent hole cutting operation. Plate 30 is relatively rigid, on the order of ⅛" to ¼" thick for acrylic plastic or plexiglass, in order to compress boot 28 against the wall in which the hole is being cut. A suitable plexiglass material is available from Paragon Plastics Company of So. El Monte, Calif.

In alternate embodiments, end plate 30 may be formed of metal or other opaque material and boot 28, or at least one edge thereof, is manually moved to the side to view drill 22 while drilling or beginning to drill the pilot hole. In still other embodiments of the present invention, end plate 30 may be formed of a combination of opaque and transparent materials.

Sleeve 32 is generally cylindrical in shape and has a diameter smaller than that of boot 28. Sleeve 32 is preferably made of a light weight rigid material such as molded plastic or vinyl. Sleeve 32 is adapted to fit over drill motor chuck 24, with its lower end removably affixed to drill motor housing 14. A screw adjustment strap or encircling clamp 36 placed over the lower end portion of sleeve 32 is the presently preferred means of removably affixing sleeve 32 to a non-rotating portion of drill frame or motor housing 14. However, other fastening means may be used, such as a compression screw clamp, a quick release clamp or screws passing through the lower end portion of the sleeve 32 into threaded openings provided in drill motor housing 14.

The other end of sleeve 32 is affixed to center opening 35 of end plate 30 by any convenient mechanism, such as by gluing.

Referring to FIG. 3, sleeve 32 contains chuck access 38 in its sidewall. As also indicated in FIGS. 1 and 2, access opening 38 is positioned in sleeve 32 to permit use of a chuck key, not shown, to adjust drill motor chuck 24 to secure or release hole saw bit 26 of hole saw 10. The presently preferred embodiment of chuck access 38 includes threaded opening 40, which is closed by plug 42, when hole saw 10 is in use.

In operation, hole saw 10 cuts an opening through a work surface while the open end of boot 28 is pressed against the surface outside the perimeter of the cut. The dust and debris created by the cutting operation is contained within dust catcher 12. As the cutting operation proceeds, boot 28 is compressed along its long axis 44, permitting hole saw 10 to move into the work surface until the cut is completed.

Figure 5:
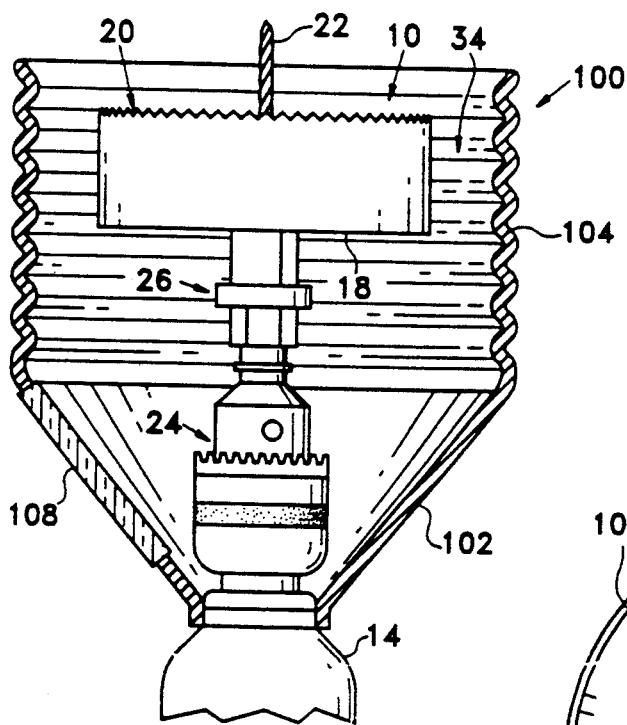
FIG. 5 is a partially cut away side elevation view of an alternate embodiment of the dustless hole saw according to the present invention.
Figure 7:
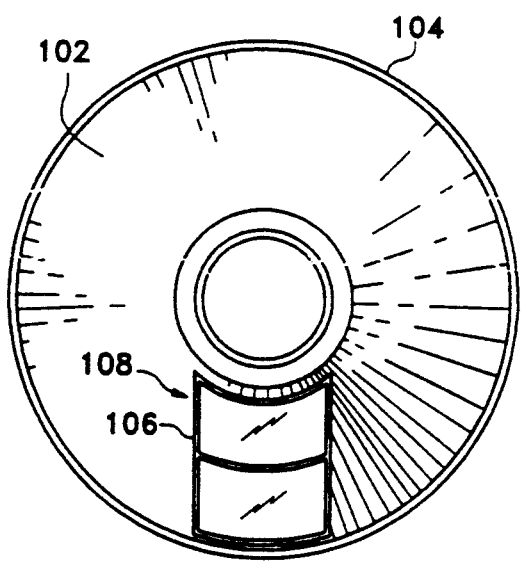
FIG. 7 is a bottom plan view of the portion of the dustless hole saw shown in FIG. 5.
Figure 6:
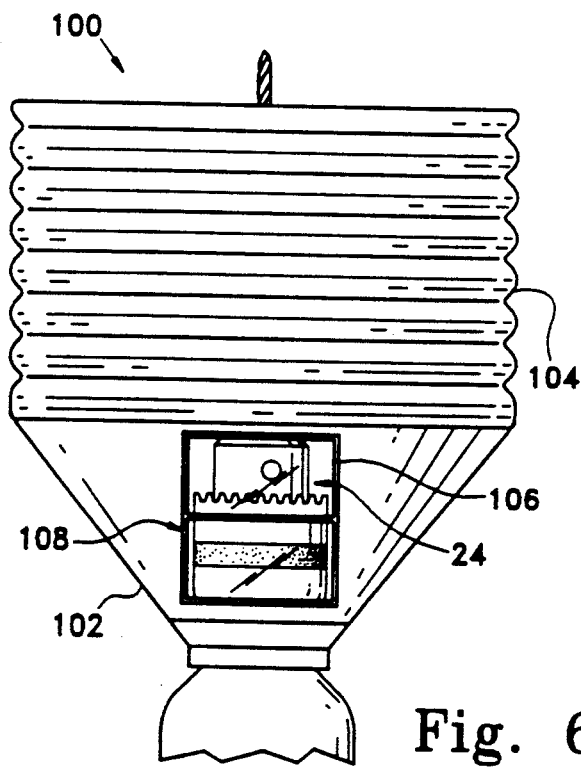
FIG. 6 is a side elevation view of a portion of the dustless hole saw shown in FIG. 5.

In an alternate embodiment of the invention, as shown in FIGS. 5-7, dust catcher 100 may be formed in a single unit by a single molding operation. Dust catcher 100 has a semi-rigid truncated cone portion 102 and a generally cylindrical compressible boot portion 104. Access is provided to drill motor chuck 24 by sliding down upper portion 106 of window 108. Window 108, as shown in the bottom plan view of FIG. 7, additionally permits the operator to view drill 22 while drilling the initial pilot hole. The same means may be used to attach dust catcher 100 to drill motor housing 14 as that described for dust catcher 12.

Alternatively, access to drill chuck 24 may be achieved without dust catcher 100 if dust catcher 100 is sufficiently flexible for it to be manually compressed to reach drill chuck 24. Similarly, compression of dust catcher 100 may be used to observe drill 22 to align with the pilot hole, obviating the need to provide a transparent window or base plate.

While this invention has been described with reference to its presently preferred embodiments, its scope is not limited thereto. Rather, such scope is only limited insofar as defined by the following set of claims and all equivalents thereof.

What is claimed is:

1. A dust catcher for use with a hole saw in a drill motor, said dust catcher comprising:
   a collapsible boot, removably mountable to a non-rotating portion of said drill motor, surrounding and extending past said hole saw when mounted in a chuck for rotation by said drill motor, said boot catching debris resulting from operation of said hole saw in said drill motor, said boot having a collapsible portion sized to surround said hole saw while permitting rotation thereof;
   chuck access means through the collapsible boot for adjusting a drill motor chuck by which said hole saw is mounted to said drill motor, said access means including a sleeve portion sized to surround said drill motor chuck while permitting rotation thereof; and
   means for viewing the operation of a pilot drill in the hole saw to position the pilot drill at a desired target in a surface to be cut, said viewing means having an end plate fastened between one end of said collapsible portion and one end of said sleeve portion providing said means for viewing said pilot drill operation;

whereby said hole saw may be mounted in said drill motor chuck on a drill motor to which said boot has been attached, said pilot drill accurately applied to said desired target and said drill motor operated to cause said hole saw to cut a circular opening in said surface while said boot is pressed against said surface to collect all debris from said operation.

2. The invention of claim 1, wherein said sleeve portion further comprises:

an aperture for providing access to the drill motor chuck.

3. The invention of claim 2, wherein the end plate is at least partially transparent.

4. The invention of claim 2, wherein the access means further comprises:

a threaded aperture in the sleeve; and a threaded plug insertable into the threaded aperture.

5. A dustless hole saw comprising:

a generally cylindrical frame;

a saw blade removably affixed to the frame, the teeth of the saw blade extending radially beyond one end of the frame;

a generally cylindrical boot enclosing the saw blade and frame, the boot compressible along its long axis;

an end plate attached within one end portion of the boot;

a generally cylindrical sleeve attachable to a drill motor frame and adapted to fit over a drill motor chuck, the sleeve having one end affixed to the end plate and the other end affixable to the frame of the drill motor; and a closable access in the sidewall of the sleeve, through which the drill motor chuck may be adjusted.

6. The dustless hole saw of claim 5 wherein the end plate is at least partially transparent.

7. The dustless hole saw of claim 5 wherein the closable access in the sidewall of the sleeve comprises:

a threaded aperture; and a threaded plug insertable into the aperture.

8. A saw enclosure attachable to a drill motor, the enclosure comprising:

a generally cylindrical boot portion compressible along its long axis;

a semi-rigid truncated conical portion extending from one end of the boot portion, the smaller end of the conical portion attachable to a non-rotating portion of the drill motor and adapted to fit over a drill motor chuck; and a transparent closable access in the truncated conical portion through which the drill motor chuck may be adjusted and through which at least a portion of a saw placed within the enclosure may be observed by an operator.

* * * * *